April 28, 1953 C. E. CARTWRIGHT 2,636,745
VERTICALLY ADJUSTABLE WHEEL SUSPENSION MEANS
Filed Feb. 10, 1949 3 Sheets-Sheet 1
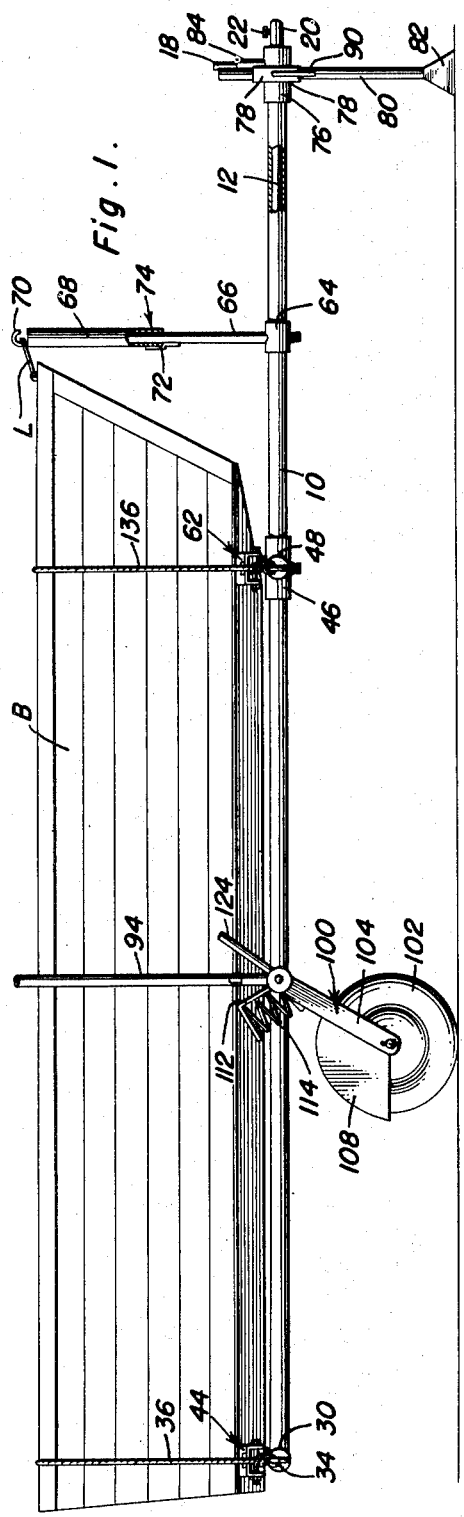
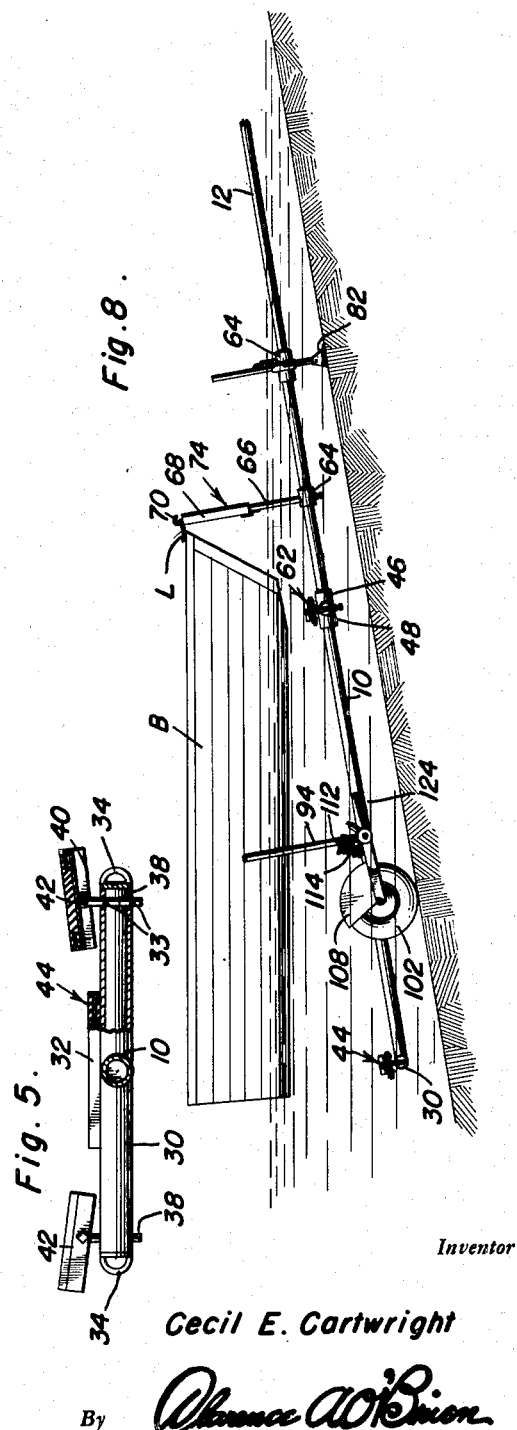
Inventor
Cecil E. Cartwright

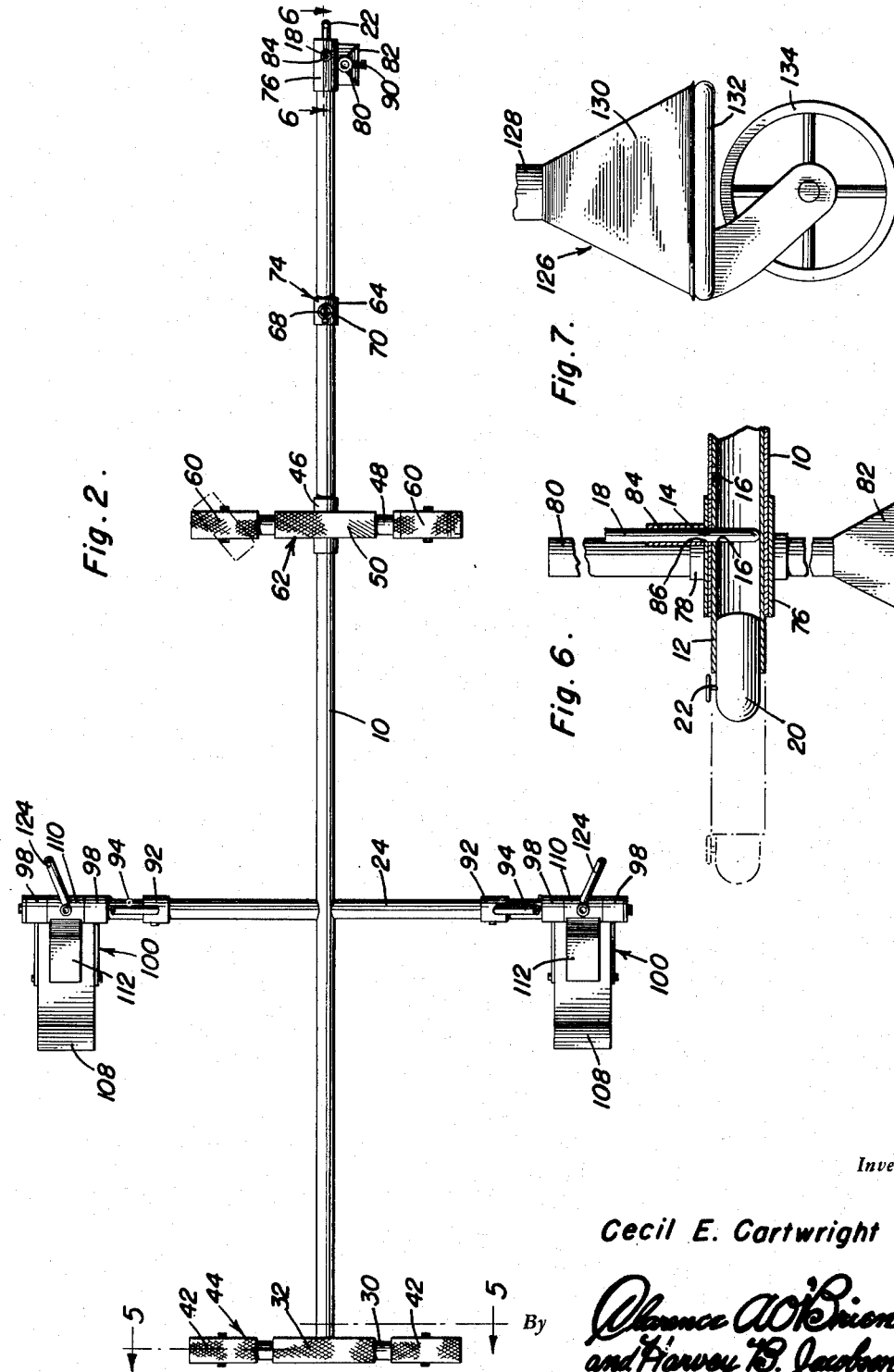

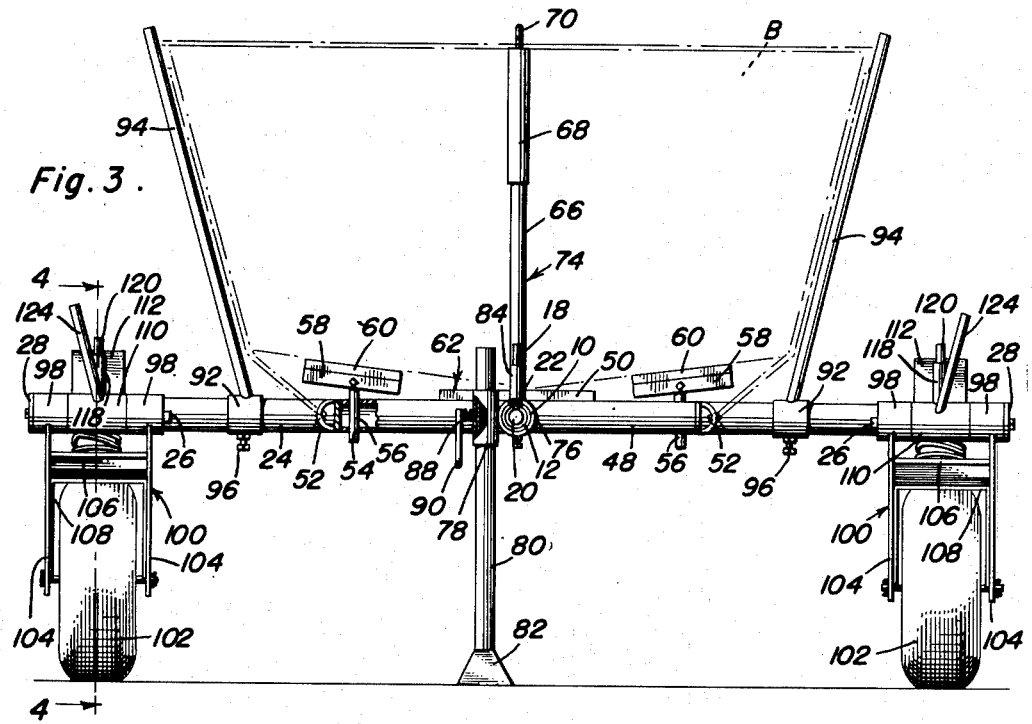
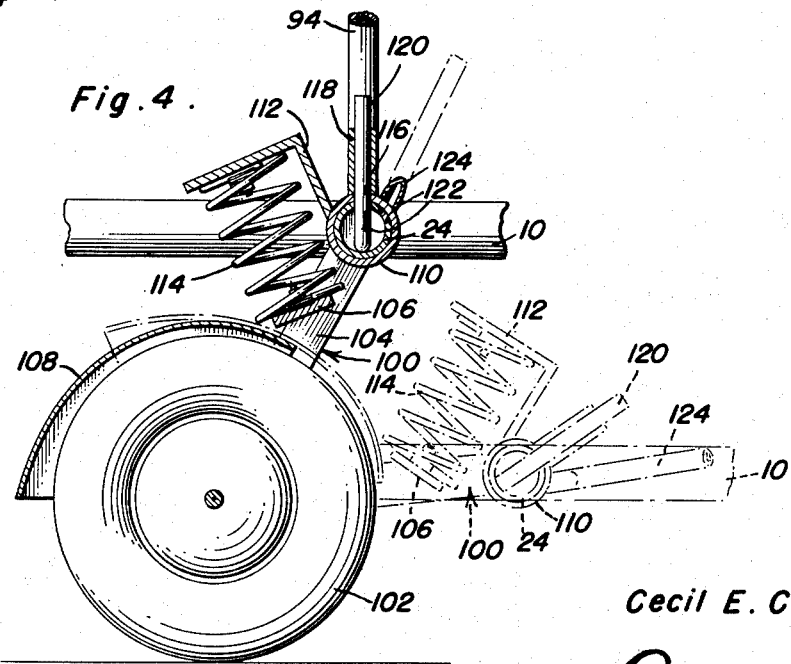
Inventor
Cecil E. Cartwright

Patented Apr. 28, 1953

2,636,745

UNITED STATES PATENT OFFICE 2,636,745

VERTICALLY ADJUSTABLE WHEEL SUSPENSION MEANS

Cecil E. Cartwright, Corpus Christi, Tex.

Application February 10, 1949, Serial No. 75,636

5 Claims. (Cl. 280—44)

This invention relates to a trailer for transporting and launching a boat and has for its primary object to facilitate the handling of a row boat and enable it to be transported in a condition ready to be easily launched, and under the control of the user at all times.

Another object is properly to cushion the trailer to protect the boat from road shocks, and at the same time enable the trailer to be lowered so that the boat may be launched in relatively shallow water without interference by the trailer.

Still another object is to provide a temporary anchorage for the boat after it has been launched and to enable the boat to be launched with an occupant or occupants without in any way exposing the occupants to wetting by the body of water in which the boat is launched.

The above and other objects may be attained by employing this invention which embodies among its features a tongue, a cross member fixed to the tongue intermediate the ends thereof, a draft coupling carried by said tongue at one end thereof, a boat cradle carried by the tongue at the end opposite the draft coupling, a boat cradle mounted on the tongue intermediate the cross member and the draft coupling, and wheels carried by the cross member for supporting the tongue in spaced relation to the ground.

Other features include a flexible member detachably coupled to opposite ends of each boat cradle for extending around a boat resting on the cradles, and holding said boat on the trailer during the transportation of the boat.

Still other features include a staff mounted on the draft tongue between the adjustable boat cradle and the draft coupling, means for detachably coupling to the staff the bow of the boat resting on the cradles, stakes extending upwardly from the cross member adjacent opposite ends thereof, said stakes serving as guides for the sides of the boat during the launching operation and the return of the boat to the trailer, and means for adjusting the wheels on the cross member to raise or lower the trailer relative to the surface being traversed, and a stand adjustably coupled to the tongue adjacent the forward end thereof for cooperation with the wheels in supporting the trailer in spaced relation to the ground.

Still further features include a draft tongue telescopically entering the forward end of the tongue of the trailer and means to hold the draft tongue in various adjusted positions relative to the trailer tongue.

In the drawings,

Figure 1 is a side view of a boat trailer embodying the features of this invention, certain portions thereof being broken away more clearly to illustrate certain details of construction, Figure 2 is a top plan view of the trailer, Figure 3 is a front view in elevation of the trailer, Figure 4 is a fragmentary enlarged sectional view taken substantially along the line 4—4 of Figure 3, Figure 5 is a fragmentary enlarged sectional view taken substantially along the line 5—5 of Figure 2, Figure 6 is a fragmentary enlarged sectional view taken substantially along the line 6—6 of Figure 2, and Figure 7 is a fragmentary side view in elevation of a modified form of stand.

Figure 8 is a side elevational view of the trailer in position for launching a boat carried thereby.

Referring to the drawings in detail, this improved trailer comprises a main tongue 10 of tubular construction into one end of which is telescopically received a draft tongue 12 which, like the main tongue 10, is of tubular construction, and the tongue 10 is provided adjacent the end receiving the draft tongue with an opening 14. Formed in the draft tongue 12 are longitudinally spaced openings 16, one of which is aligned with the opening 14 to receive a removable pin 18 by means of which the tongues are held in various adjusted positions against relative longitudinal movement. A plug 20 is fixed in the end of the draft tongue 12 opposite that which enters the main tongue 10, and this plug is equipped with a suitable draft coupling 22 by means of which the device may be detachably coupled to a traction vehicle (not shown). Fixed to the main tongue 10 intermediate the ends thereof and extending transversely with relation thereto is a cross member 24 which, in conjunction with the main tongue 10, forms the chassis of the trailer. Fixed to the cross member 24 near each end thereof is a radially extending stop lug 26, and removably secured to each end of the cross member is a stop plate 28 which cooperates with the adjacent stop 26 in retaining the wheel yokes and the adjusting mechanism thereof in place on the cross member. Like the tongue 10, the cross member 24 is formed of circular cylindrical stock which may be tubular in form. A cross arm 30 is fixed to the tongue 10 at the end remote from the end in which the draft tongue 12 is received, and the axis of the cross arm 30 lies in a horizontal plane and parallel with the axis of the cross member 24. A suitable pad 32 is secured in any suitable manner to the cross arm 30 on the upper side thereof and formed adjacent opposite ends in the cross arm 30 are aligning vertical openings 33 for the reception of the pad holding pins, to be more fully hereinafter described. Attached to opposite ends of the cross arm 30 are eyes 34 to which opposite ends of a flexible member 36 are adapted to be connected when a boat is in place on the trailer. Extending upwardly through the openings 33 in the cross arm 30 are stems 38, to the upper ends of which are pivotally coupled inverted channel members 40 on which suitable pads 42 are supported in any suitable manner. The cross arm 30, the pads 32 and 42, together with the stems 38 and channel members 40, all cooperate to form a boat cradle designated generally 44 at the rear end of the tongue 10.

Mounted on the tongue 10 between the cross member 24, and the end of the tongue through which the draft tongue 12 enters, in a sleeve 46 which carries a transversely extending cross arm 48 which, like the cross arm 30, is equipped with a pad 50. Opposite ends of the cross arm 48 are provided with eyes 52, and, like the cross arm 30, the cross arm 48 is provided adjacent opposite ends with vertical openings 54 for the reception of stems 56 of channel members 58 carrying pads 60. The equipment just described forms a boat cradle designated generally at 62 which corresponds to the cradle 44 except for the fact that it is adjustable longitudinally on the tongue 10. Mounted for longitudinal adjustment on the tongue 10 between the boat cradle 62 and the forward end of the tongue through which the draft tongue 12 enters it is a sleeve 64 from which extends upwardly a standard 66 over the upper end of which is fitted a sleeve 68 which carries at its upper end a hook 70 for a purpose to be more fully hereinafter explained. A suitable bracket arm 72 is fixed to the standard 66 and limits the downward movement of the sleeve 68 thereover, and these parts cooperate to form a staff designated generally 74, to the upper end of which the bow of a boat resting on the cradles 44 and 62 is attached.

Mounted for longitudinal adjustment along the tongue 10 adjacent the end thereof receiving the draft tongue 12 is a sleeve 76 to one side of which is welded or otherwise secured a vertically extending sleeve 78 in which a column 80 is adjustably supported. This column is provided adjacent its lower end with a foot or base 82, and extending upwardly from the sleeve 76 is a tubular guide 84 which aligns with an opening 86 formed in the sleeve 76 to receive the pin 18 previously described. Adjustment of the sleeve 76 on the column 80 is accomplished through the medium of a conventional set screw 88 which is actuated by a conventional hand lever 90.

Mounted for longitudinal sliding movement adjacent each end of the cross member 24, between the tongue 10 and the stops 26, are sleeves 92 carrying upwardly extending stakes 94 which preferably extend outwardly as illustrated in Figure 3 and serve as guides for the sides of a boat resting on the boat cradles 44 and 62. The sleeves 92 are held in proper adjusted position on the cross member 24 by suitable set screws 96 so that the trailer may be employed for boats of different widths.

Mounted for rocking movement about the cross member 24 adjacent opposite ends thereof are spaced aligned sleeves 98 of a fork designated generally 100. A suitable wheel 102 is mounted between opposite legs 104 of each fork 100, and extending between the arms 104 of each fork above their respective wheels 102 is a cross bar 106. A suitable guard 108 encloses a segment of each wheel 102 and each guard 108 is supported on the arms 104 of the fork 100. Mounted for rocking movement on the cross member 24 between each pair of sleeves 98 are sleeves 110, each of which carries an angle bracket 112, and extending between each angle bracket 112 and the cross bar 106 of its respective fork 100 is a spring 114 which serves yieldingly to sustain the trailer, and its load on the wheels 102. Each sleeve 110 is provided with a radial opening 116 which is surrounded by a radially extending tubular guide 118 in which a retaining pin 120 is received. The cross member 24 is provided with peripherally spaced radial openings 122 for the reception of the pin 120 in order that the fork 100 may be yieldingly supported in various adjusted positions about the axis of the cross member. A suitable handle 124 extends upwardly and outwardly from each sleeve 110 and serves to enable the position of the sleeve 110 to be manually controlled.

In a modified form of the device, I may find it advantageous to employ a stand designated generally 126 (Fig. 7) comprising a column 128 which corresponds to the column 80 previously described and is equipped with a foot or base 130 carrying a suitable fixture 132 in which a caster wheel 134 is mounted to rotate. The stand 126 may be substituted for the stand previously described, should it be found desirable to support the forward end of the tongue 10 for rolling contact with the surface being traversed.

In use, when it is desired to load a boat on the device, the pins 120 are extracted from the openings 122, thus allowing the forks 100 to swing about the axis of the cross member 24 so that the entire structure may be lowered to the ground. The boat B to be loaded is then placed in position on the boat cradles 44 and 62, it being understood that the cradle 62 has been adjusted longitudinally on the tongue 10 to engage the boat at the proper point. Also it will be understood that the stakes 94 have been adjusted on the cross member 24 to a position where the boat will easily fit between them. Upon placing the boat on the cradles 44 and 62 and between the stakes 94, the bow of the boat is coupled by means of a link L to the hook 70 of the staff 74, and with the boat thus positioned and held in place, the tongue is raised by rotating the sleeves 110 by grasping the handles 124 and exerting lifting effort thereon. The sleeves 110 are rotated about the cross member 24 until one of the openings 116 aligns with the vertical opening 122 in the cross member 24, at which time the pin 120 will drop by gravity, and lock the sleeves 110 against further rotary movement about the cross member 24. In this position, the weight of the chassis and the boat loaded thereon will be yieldingly sustained on the wheels 102 through the medium of the springs 114. The flexible member 36 is then secured to the eyes 34 of the cross arm 30 so as to embrace the boat B adjacent the stern thereof, and a similar flexible member 136 is coupled to the eyes 52 of the cross arm 48 of the adjustable cradle 62, and secured across the bow of the boat. The draft coupling 22 of the draft tongue 12 is then connected to a traction vehicle in a conventional manner to support the forward end of the tongue 10, and upon turning the hand lever 90 to loosen the set screw 88, the column 80 may be lifted to move the foot or base 82 clear of the ground, and the parts clamped in this position by again tightening the set screw 88. The boat may then be transported to any suitable location and when it is desired that it be launched, the column 80 and the foot piece or base 82 are lowered to support the forward end or the tongue 10, whereupon the pin 18 may be extracted from its position in the openings 14, whereupon the draft tongue 12 may be extended to the desired position and the pin 18 reinserted to engage in one of the openings 16 remote from the plug 20. In this way, the draft tongue may be extended so that it can be attached to a vehicle, and upon elevating the column 80 of the stand, the trailer with the boat thereon may be advanced into the water as suggested in Figure 8, it being understood that the flexible members 36 and 136 were released from their respective eyes 34 and 52 so that the boat may float free as suggested in Figure 8, and will be coupled to the trailer only through the medium of the link L and hook 70. Obviously, the boat may be loaded before the trailer is introduced into the water, so that the occupants of the boat need not become wet during the launching thereof. The trailer obviously may be left in the water as the only operation necessary for the further release of the boat is the disengagement of the link L from the hook 70. The boat, after having made its voyage on the water, may return to its original position over the trailer using the stakes 94 as the guides along with the staff 74, and upon manipulating the boat to enter the space between the stakes 94, it is obvious that the bow of the boat may again be coupled to the hook 70 through the medium of the link L. With the boat thus returned to its position above the trailer, it is obvious that upon exerting pull on the draft tongue 12, the trailer together with the boat coupled thereto will be moved upwardly away from the water in which the boat was launched, so that it will settle onto the saddles 44 and 62 and in its original position between the stakes 94, with the occupants remaining therein until the boat has been returned to dry land. By adjusting the position of the wheels 102 about the axis of the cross member 24, it will be obvious that the height of the tongue 10 may be governed according to the depth of water in which the boat is being launched, and the angle of the beach at which the boat is being launched.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

1. A wheel mounting comprising a pair of spaced members each having first and second ends, an axle connecting said members adjacent the first ends thereof, a shaft, the second ends of said members being journaled in spaced relation on said shaft, a sleeve rotatably received on said shaft between said members, means for adjustably holding said shaft and sleeve in fixed angular relation, and means connecting said sleeve and members for resiliently resisting angular displacement of said members relative to said sleeve, said first mentioned means including said sleeve and said shaft having aligned apertures, a tubular extension on said sleeve in alignment with said apertures, and a pin slidable in said extension extending through said apertures.

2. A wheel mounting comprising a cross member, a pair of spaced aligned sleeves rockably mounted on the cross member, means fixed to the sleeves for mounting a wheel for rotation about an axis spaced from the cross member, a further sleeve rockably mounted on the cross member between the pair of sleeves, combined means for securing said further sleeve to the cross member in adjusted angular relation thereto and also for securing the further sleeve against longitudinal movement on the cross member to limit longitudinal movement of the pair of sleeves on the cross member, and spring means connecting the wheel mounting means and the further sleeve for yieldingly retaining the wheel mounting means in a predetermined angular relation with respect to the further sleeve, said combined means comprising the further sleeve and the cross member having aligned apertures, and a pin removably extending through the apertures.

3. The combination of claim 2 including a radially extending handle on the further sleeve, whereby the further sleeve may be rocked between adjusted positions.

4. A wheel suspension assembly comprising a shaft, a wheel mounting structure pivotally suspended from said shaft, a sleeve freely rotatably received on said shaft adjacent said wheel mounting structure, means engaging said sleeve and said shaft when said sleeve and said shaft are in a preselected position relative to one another releasably locking said sleeve against free rotation on said shaft, resilient means interconnecting said sleeve and said wheel mounting structure providing limited swinging movement of said wheel mounting structure with respect to said sleeve, a bracket on said sleeve and a member constituting a seat on said wheel mounting structure intermediate the ends thereof, said resilient means being disposed between and connected to said bracket and seat member.

5. A wheel suspension assembly comprising a shaft, a wheel mounting structure pivotally suspended from said shaft, a sleeve freely rotatably received on said shaft adjacent said wheel mounting structure, means engaging said sleeve and said shaft when said sleeve and said shaft are in a preselected position relative to one another releasably locking said sleeve against free rotation on said shaft, resilient means interconnecting said sleeve and said wheel mounting structure providing limited swinging movement of said wheel mounting structure with respect to said sleeve, a bracket on said sleeve and a member constituting a seat on said wheel mounting structure intermediate the ends thereof, said resilient means being disposed between and connected to said bracket and seat member, and lever means projecting from said sleeve circumferentially spaced from said releasable locking means for rotating the sleeve upon release of said releasable locking means.

CECIL E. CARTWRIGHT.

References Cited in the file of this patent

UNITED STATES PATENTS

| Number | Name | Date |
|---|---|---|
| 1,779,887 | Melanson | Oct. 28, 1930 |
| 2,087,299 | Pribil | July 20, 1937 |
| 2,141,781 | Allen | Dec. 27, 1938 |
| 2,174,063 | Richards | Sept. 26, 1939 |
| 2,198,270 | Maranville | Apr. 23, 1940 |
| 2,332,991 | Commire | Oct. 26, 1943 |
| 2,361,951 | Livermon | Nov. 7, 1944 |
| 2,374,383 | Sampsell | Apr. 24, 1945 |
| 2,442,248 | Sampsell | May 25, 1948 |
| 2,462,964 | Heggen | Mar. 1, 1949 |
| 2,465,098 | Inskeep | Mar. 22, 1949 |
| 2,494,144 | Restall | Jan. 10, 1950 |
| 2,497,072 | Cooper | Feb. 14, 1950 |
| 2,503,539 | Yarbrough | Apr. 11, 1950 |
| 2,506,699 | Byrd | May 9, 1950 |
| 2,507,980 | Knapp | May 16, 1950 |
| 2,525,506 | Wiedman | July 25, 1950 |